United States Patent [19]

Gerhard et al.

[11] Patent Number: 4,872,339
[45] Date of Patent: Oct. 10, 1989

[54] MASS FLOW METER

[75] Inventors: Bruce Gerhard, Canton; Bruce Schulman, Newton, both of Mass.

[73] Assignee: NEC Electronics Inc., Mountain View, Calif.

[21] Appl. No.: 227,934

[22] Filed: Aug. 3, 1988

[51] Int. Cl.[4] ................................. G01F 1/68
[52] U.S. Cl. ........................ 73/204.14; 73/118.2; 364/510
[58] Field of Search ............ 73/118.2, 204.14; 364/510

[56] References Cited

U.S. PATENT DOCUMENTS

| | | | |
|---|---|---|---|
| 4,043,195 | 8/1977 | Hunting | 73/204.14 |
| 4,649,745 | 3/1987 | Kondo et al. | 73/204.14 |
| 4,753,111 | 6/1988 | Caron et al. | 73/204.14 |

OTHER PUBLICATIONS

G. Gurtcheff et al., "Mass Airflow Sensor: Ambient Temperature Compensation Design Considerations", General Motors Corporation Publication, 4-6-86, pp. 4-11.
H. Fujisawa et al., "Electronic Controlled Gasoline Injector", Kouichirou Ojima, Tokyo 1987, pp. 1-7.
Sumal & Sauer, "Bosch Mass Air Flow Meter: Status and Further Aspects", Contained in the Compendium of Papers Entitled, "Sensors and Actuators SP-567" (SAE, 1984), pp. 19-28.

Primary Examiner—Herbert Goldstein
Attorney, Agent, or Firm—Skjerven, Morrill, MacPherson, Franklin & Friel

[57] ABSTRACT

A mass air flow measurement circuit is disclosed which provides a digital output without using a separate analog to digital (A/D) converter. This air flow measurement circuit includes a bridge circuit, wherein voltage is supplied to the bridge to control current through one or more sense elements in order to keep the temperature and resistances of the sense elements constant and balance the bridge. An electrical comparator is used to sense the balance of the bridge, and the output of the comparator is applied to an input port of a microcomputer. The microcomputer generates a rectangular wave pulse width modulated (PWM) signal whose duty cycle is increased or decreased in response to the output of the comparator. The PWM signal is then amplified and applied to the bridge to balance the bridge. Mass air flow is then calculated by multiplying the duty cycle of the PWM signal by a proportionally constant.

8 Claims, 2 Drawing Sheets

MASS FLOW METER

FIELD OF THE INVENTION

This invention relates to mass flow meters and in particular to a mass air flow meter used to measure the mass air flow through an internal combustion engine's intake manifold.

BACKGROUND OF THE INVENTION

When a microcomputer is used to control the air/fuel mixture in an internal combustion engine or used to control other parameters affected by the rate of air/fuel mixture burned, it is necessary to measure the mass air flow through the engine's intake manifold. The measurement can be made indirectly by measuring ambient air pressure, intake manifold air pressure, intake manifold air temperature, and throttle angle, but a direct measurement can be made more precisely and is therefore more desirable. Many current engine control systems make the direct measurement of mass air flow by measuring the electrical resistance of a heated wire placed in the intake manifold. The wire must have a high thermal coefficient of resistance where a change in the resistance of the wire is directly proportional to a change in its temperature. Heat is removed from the wire in direct proportion to the mass of the air flowing past the wire. In one method, heat, in the form of electrical power, is supplied to the wire to maintain the wire at a constant temperature/resistance. Typically, an analog-to-digital converter is used to measure the resistance of the wire, and a digital output is used to calculate the mass air flow.

Examples of these prior art mass air flow meters are discussed below with reference to FIGS. 1-3.

A General Motors Corporation publication entitled, "Mass Airflow Sensor: Ambient Temperature Compensation Design Considerations", by G. Gurtcheff et al., teaches an air flow measurement circuit as shown in FIG. 1. In the circuit of FIG. 1, resistor $R_s$ is the sensing element, resistor $R_t$ is a resistor element which compensates for changes in ambient temperature, and resistors $R_a$, $R_b$ and $R_c$ are resistors with very low temperature coefficients of resistance. Resistors $R_s$, $R_t$, $R_a$, $R_b$ and $R_c$ are arranged to form a bridge circuit, and a feedback means, comprising operational amplifier 10 and transistor 20, is designed to keep the resistance of resistor $R_s$ at a fixed resistance/temperature to balance the bridge. The feedback means is purely analog and produces a voltage $V_b$ at the emitter of transistor 20, which is applied to the bridge at point A and balances the bridge. Voltage $V_b$ is also coupled to a voltage controlled oscillator (not shown) to produce a frequency proportional to voltage $V_b$. This frequency is then used as a measurement of mass air flow.

A Japanese publication entitled, Electronic Controlled Gasoline Injector, by H. Fujisawa et al, publisher: Kouichirou Ojima, Tokyo, 1987, teaches an air flow measuring circuit, shown in FIG. 2, which is similar to the General Motors sensor described above, wherein the output of operational amplifier 30 is an analog voltage which is applied to the bridge circuit to keep the temperature and resistance of sense element 40 constant. The voltage measured at point A on the bridge circuit, which is proportional to the analog output of operational amplifier 30, is then used to measure the air flow over sense element 40.

A paper entitled "Bosch Mass Air Flow Meter: Status and Further Aspects", by Sumal and Sauer, contained in the compendium of papers entitled, "Sensors and Actuators SP-567" (SAE, 1984), teaches a circuit, shown in FIG. 3, similar to the above-mentioned circuits, for measuring mass air flow. In FIG. 3, sense element $R_H$ and element $R_K$ are incorporated in a bridge circuit, where element $R_K$ is a temperature compensation sensor. As in the above-mentioned prior art, operational amplifier 50, having inputs coupled to bridge terminals A and B, provides an output voltage, coupled to bridge terminals C and D, which keep the resistance and temperature of sense element $R_H$ constant. The voltage $U_M$ measured across fixed resistor $R_3$ is thus proportional to the output voltage of operational amplifier 50. Only analog voltage is generated in the circuit as in the above-mentioned prior art.

Engine design engineers are now asking for analog to digital (A/D) converters with ten or twelve bits of precision. A/D converters of this precision are expensive, especially if they must be designed to operate in the harsh environment of an automobile engine compartment. As seen, prior art air flow measurement circuits do not provide for the inexpensive generation of digital signals corresponding to the mass air flow over a sense element. In addition to requiring a separate A/D converter, these prior art mass air flow circuits must perform a squaring of the voltage applied to the bridge circuit, since it is the power dissipated by the sense element which is substantially proportional to mass air flow.

SUMMARY OF THE INVENTION

A mass air flow meter is disclosed herein which measures mass air flow to a high precision and provides a digital output without using a separate analog to digital (A/D) converter. The invention is based upon the principle of making the entire mass air flow system, including a sensor and a microcomputer, a very high precision tracking A/D converter. This mass air flow measurement circuit includes a bridge circuit, wherein voltage is supplied to the bridge to control the current through a sense element in order to keep the temperature and resistance of the sense element constant and balance the bridge. A window comparator is used to sense the balance of the bridge, and the output of the comparator is applied to a designated input port of the microcomputer. The microcomputer generates a rectangular wave pulsewidth modulated (PWM) signal at an output which has a duty cycle proportional to the voltage needed to be applied to the bridge for balancing the bridge. The duty cycle is also proportional to the power supplied to the bridge, since the PWM signal results in a predetermined power supplied to the bridge when the PWM signal is high and zero power supplied to the bridge when the PWM signal is low. The PWM signal is then amplified and applied to the bridge circuit, balancing the bridge circuit. Additional output ports of the microcomputer directly provide a digital readout corresponding to the duty cycle of the PWM signal. Thus, reading the mass air flow over the sense element is simply a matter of reading the duty cycle register of the microcomputer and multiplying the result by a proportionality constant. As seen, our circuit provides a highly accurate reading of mass air flow over a sense element which is directly generated in digital format without the need of a relatively expensive A/D converter.

DETAILED DESCRIPTION

Figure 1:
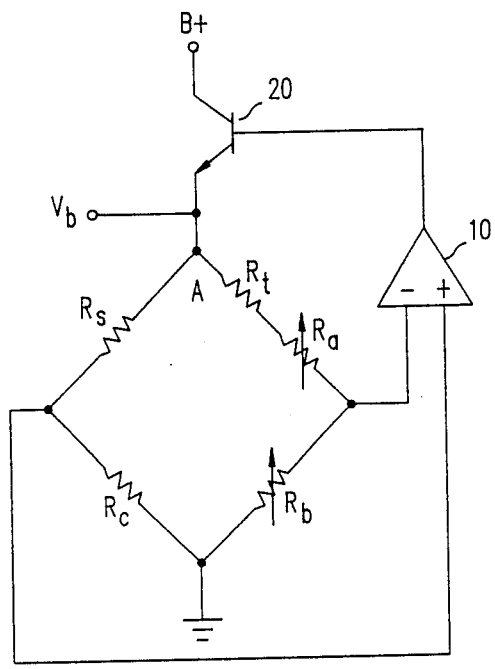
FIG. 1 shows a prior art mass air flow meter using analog voltages exclusively.
Figure 2:
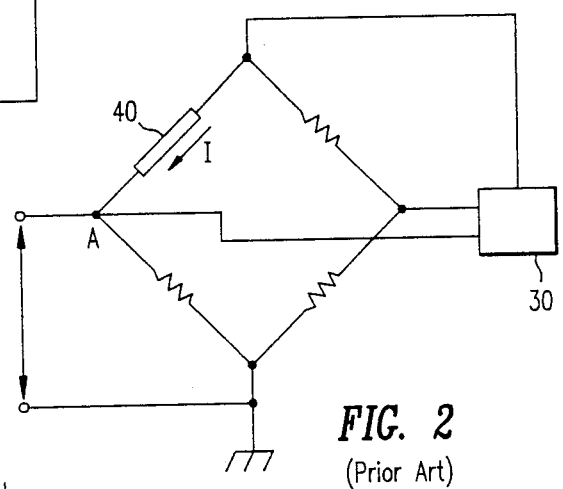
FIG. 2 shows a second prior art mass air flow meter circuit using analog voltages exclusively.
Figure 3:
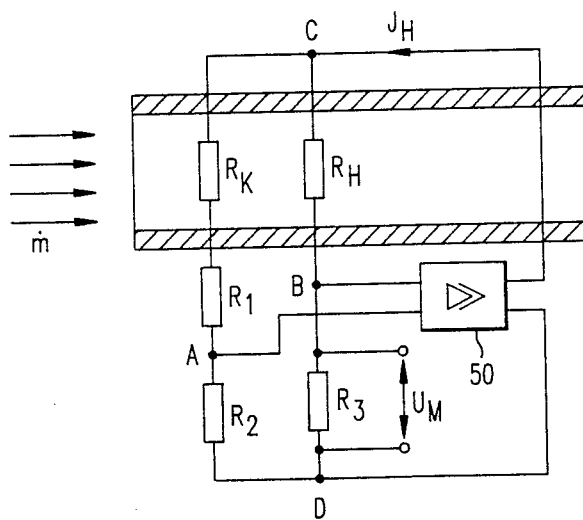
FIG. 3 shows a third prior art mass air flow meter using analog voltages exclusively.
Figure 4A:
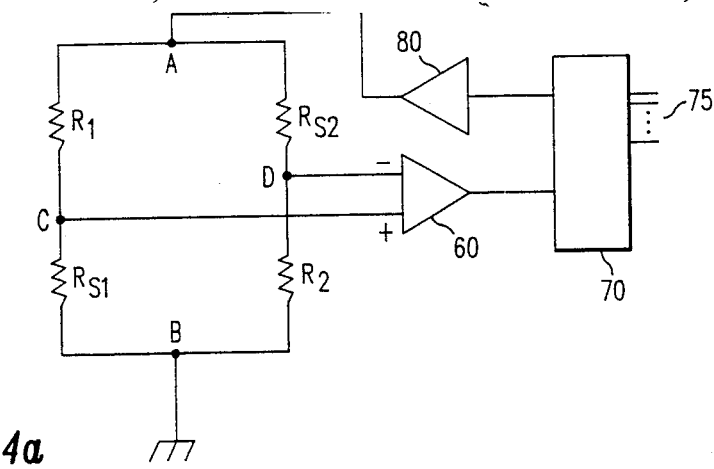
FIG. 4a is a schematic of the preferred embodiment of our inventive mass air flow meter.

FIG. 4a shows a schematic of a preferred embodiment of our mass air flow meter wherein resistors R1 and R2 are coupled with sense elements $R_{s1}$ and $R_{s2}$ to form a bridge circuit. Resistors R1 and R2 are fixed resistors having very low temperature coefficients of resistance so as to maintain their resistance under a wide range of temperatures. Sense elements $R_{s1}$ and $R_{s2}$ have relatively high temperature coefficients of resistance and are located within the intake manifold of an internal combustion engine so that the mass air flow through the manifold acts to remove heat from sense elements $R_{s1}$ and $R_{s2}$ and influence their resistance.

In FIG. 4a, a voltage is applied to an input of the bridge circuit at point A (the common node of resistor R1 and sense element $R_{s2}$) with a reference voltage, for example, ground voltage, applied at point B (the common node of resistor R2 and sense element $R_{s1}$). The output of the bridge circuit is measured as the voltage difference between point C (the common node of resistor R1 and sense element $R_{s1}$) and point D (the common node of resistor R2 and sense element $R_{s2}$). The bridge circuit is balanced (i.e., voltage at point C equals voltage at point D) when the ratio of the resistance of resistor R1 to the resistance of sense element $R_{s1}$ equals the ratio of the resistance of sense element $R_{s2}$ to the resistance of resistor R2. Or expressed mathematically, the bridge is balanced when $$\frac{R1}{R_{s1}} = \frac{R_{s2}}{R2}. \qquad (1)$$

Ideally, the resistors R1 and R2 are identical and sense elements $R_{s1}$ and $R_{s2}$ are identical so that the voltage at points C and D will change equally but in opposite directions due to a common change in the resistances of sense elements $R_{s1}$ and $R_{s2}$. Thus, a high degree of common mode rejection is obtained. A fixed resistor R3 may be substituted for $R_{s2}$ as in FIG. 4b, but common mode rejection would be reduced as well as the sensitivity of the mass air flow meter to changes in mass air flow.

The voltage at point A is controlled to increase or decrease the current through sense elements $R_{s1}$ and $R_{s2}$, as air flows over sense elements $R_{s1}$ and $R_{s2}$ and removes heat from sense elements $R_{s1}$ and $R_{s2}$, so as to maintain the balanced relationship of equation 1. Thus, the resistance/temperature of sense elements $R_{s1}$ and $R_{s2}$ is maintained at a constant value. The heat removed from sense elements $R_{s1}$ and $R_{s2}$ is substantially proportional to the mass air flow and, consequently, also substantially proportional to the power supplied to sense elements $R_{s1}$ and $R_{s2}$ to maintain sense elements $R_{s1}$ and $R_{s2}$ at a constant temperature.

Figure 4B:
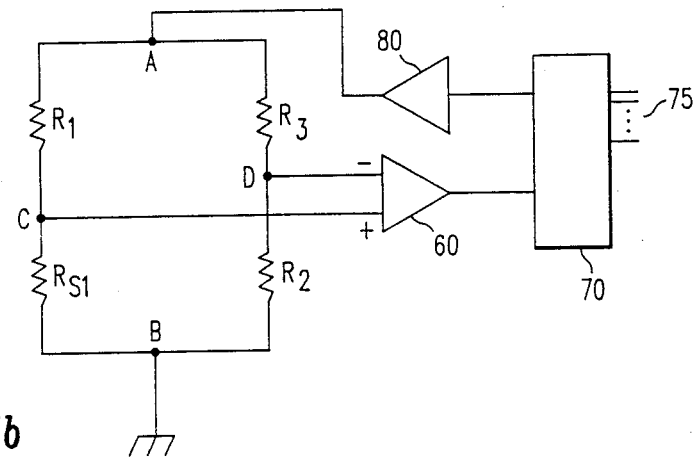
FIG. 4b is a schematic of an alternate embodiment of our inventive mass air flow meter.

In the embodiment of FIG. 4b, Resistors R2 and R3 together provide a relatively high resistance so that little current flows through resistors R2 and R3 and any current induced resistance changes will be negligible.

Further discussion of the relationship between mass air flow and power dissipated by a sensing element is found in the General Motors publication entitled, "Mass Airflow Sensor: Ambient Temperature Compensation Design Consideration" by G. Gurtcheff et al., discussed supra and incorporated herein by reference.

In FIG. 4a, sense elements $R_{s1}$ and $R_{s2}$, in one embodiment, may be a platinum wire with a relatively high (0.003) thermal coefficient of resistance so that an increase of temperature will raise the resistances of sense elements $R_{s1}$ and $R_{s2}$ in accordance with the formula $$R_{sb} = R_{sa}[1 + p\Delta T], \qquad (2)$$

where
- $R_{sa}$ is the resistance of sense elements $R_{s1}$ and $R_{s2}$ before the change in temperature;
- $R_{sb}$ is the resistance of sense elements $R_{s1}$ and $R_{s2}$ after the change in temperature;
- $\Delta T$ is the change in temperature in degrees centigrade; and
- p is the temperature coefficient of resistance, which, in the example of the platinum wire, is approximately 0.003.

As seen from equation 2, the change in resistance of sense elements $R_{s1}$ and $R_{s2}$ is proportional to temperature.

In the preferred embodiment of FIG. 4a, $R_{s1}$, $R_{s2}$, R1, and R2 are contained in an integrated circuit (IC) sensor. In this preferred embodiment, $R_{s1}$ and $R_{s2}$ use the resistance/temperature characteristics of silicon to achieve a relationship between air flow and the power supplied to the bridge circuit to balance the bridge. One model of IC sensor which may be used is the AWM 2000 Series mass air flow sensor by Micro Switch, Fremont, IL. By using an IC sensor, all resistors will be at identical temperatures as well as be very accurate and track well over time and a wide range of temperatures.

In FIG. 4a, the voltages at C and D are applied to the noninverting and inverting ports, respectively, of window comparator 60. Window comparator 60 detects whether the difference between the voltages between points C and D are within a certain range. Hence, if the voltage at point C is sufficiently higher than the voltage at point D, the output of comparator 60 will be high, and, conversely, if the voltage at point C is sufficiently lower than the voltage at point D, the output of comparator 60 will be low. A low output of comparator 60 indicates that the resistances of sense elements $R_{s1}$ and $R_{s2}$ are too low and that the power supplied to sense elements $R_{s1}$ and $R_{s2}$ must be raised to increase the resistances of sense elements $R_{s1}$ and $R_{s2}$ and balance the bridge. Conversely, a high output of comparator 60 indicates the power supplied to sense elements $R_{s1}$ and $R_{s2}$ must be lowered to balance the bridge.

In an alternative embodiment, comparator 60 need not be a window comparator but may be a single operational amplifier operating at full gain, which provides a high signal at its output if the voltage at point C is greater than the voltage at point D and provides a low signal if the voltage at point C is less than the voltage at point D.

The output of comparator 60 is applied to appropriate input ports of microcomputer 70, where microcomputer 70 processes this high or low output of comparator 60 and generates a rectangular wave pulsewidth modulated (PWM) signal whose duty cycle is determined by the output of comparator 60 in conjunction with a tracking algorithm which makes repeated small changes in the duty cycle of the PWM signal until the output of comparator 60 changes. The duty cycle of the PWM signal may be expressed digitally at output ports 75 of microcomputer 70 in either parallel or serial format, hence providing direct digital measurement of the duty cycle of the PWM signal, and/or used internal to microprocessor 70 to control other parameters in the engine's operation.

The PWM signal is applied to amplifier 80 which amplifies the PWM signal to a predetermined level signal to sufficiently control the resistances of sense elements $R_{s1}$ and $R_{s2}$ over the entire range f mass air flow. The amplified PWM output of amplifier 80 is applied to point A of the bridge circuit and either increases or decreases the power supplied to sense elements $R_{s1}$ and $R_{s2}$ depending on the duty cycle of the PWM signal. The period of the PWM signal is so small relative to the time required to measurably change the resistance of sense elements $R_{s1}$ and $R_{s2}$ that the rectangular wave PWM output of amplifier 80 can be considered as a constant voltage of amplitude $V_{peak} \times DC$, where $V_{peak}$ is the peak voltage of the PWM output of amplifier 80 and DC is the duty cycle of the PWM output. Hence, the power supplied to sense elements $R_{s1}$ and $R_{s2}$ can be considered as $$DC \times A, \qquad (3)$$

where A is a proportionality constant encompassing, inter alia, the constant $V^2_{peak}$. Therefore, since the digital readout of the duty cycle at output ports 75 is proportional to the power supplied to sense elements $R_{s1}$ and $R_{s2}$ required to balance the bridge, reading the mass air flow over sense elements $R_{s1}$ and $R_{s2}$ is simply a matter of reading the duty cycle register of microcomputer 70 and multiplying the result by a proportionality constant.

Ideally, the tracking, or update, algorithm incorporated in microcomputer 70 makes changes in the duty cycle of the PWM signal until a one bit change in the duty cycle, as measured at output ports 75, produces a change in the state of the output of comparator 60. The algorithm then maintains the voltage difference between points C and D within the desired range. Thus, the duty cycle output at output ports 75 will be adjusted at a rate determined by the update algorithm to maintain the balanced relationship of equation 1. The precision of the measurement is limited by the precision of comparator 60, the precision of the PWM duty cycle, and the stability of the resistors used in the bridge circuit.

Microcomputer 70, in the preferred embodiment of the invention, is Model µPD78312, manufactured by NEC Corporation. The NEC microcomputer provides a PWM output port for connection to the input port of amplifier 80 of FIGS. 4a and 4b.

Figure 5:
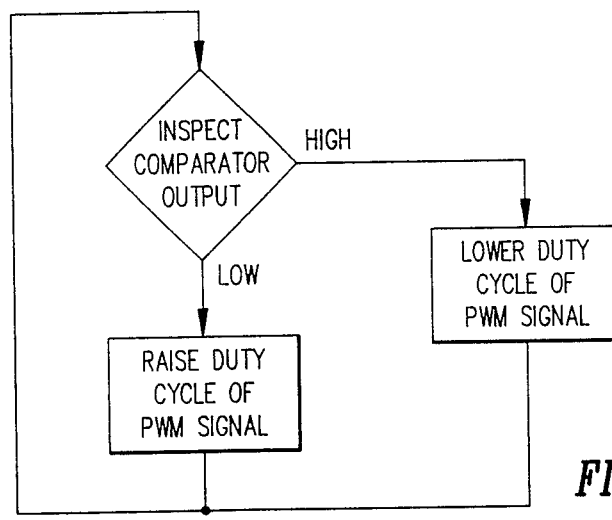
FIG. 5 shows a flow chart of an algorithm used in one embodiment of the invention.

FIG. 5 shows a basic flowchart of an update algorithm used to adjust the duty cycle of the PWM signal. As seen, the algorithm uses a control loop and raises or lowers the duty cycle of the PWM signal in response to the output of comparator 60.

Embodiments other than those shown in FIGS. 4a, 4b, and 5 will occur to those of ordinary skill in the art while still incorporating the inventive concepts of my invention. Thus, my invention is limited only by the scope of the following claims.

We claim:

1. A mass air flow meter comprising:
   a bridge circuit having first and second input terminals and having first and second output terminals, said bridge circuit having incorporated in one or more arms a resistive sensing means, said sensing means having a resistance which varies proportionally to a change in its temperature, wherein said sensing means has heat removed from it by an air flow;
   a comparator means with first and second input terminals coupled to said first and second output terminals of said bridge circuit, respectively, wherein said comparator means produces an output in response to a voltage difference between voltages at said first and second output terminals of said bridge circuit;
   a microcomputer with an input terminal coupled to receive said output of said comparator, said microcomputer producing a pulsewidth modulated signal at a first output of said microcomputer whose duty cycle is controlled solely by said output of said comparator in conjunction with an update algorithm, wherein said algorithm uses a control loop which makes repeated evaluations of said output of said comparator and makes repeated changes in said duty cycle of said pulsewidth modulated signal until said output of said comparator has changed in response to a change in said duty cycle, said microcomputer generating digital signals corresponding to said duty cycle of said pulsewidth modulated signal, said digital signals corresponding to said duty cycle being used for computing mass air flow and to control parameters in an engine's operation, said pulsewidth modulated signal having a period which is small relative to any time required to measurably change said resistance of said sensing means; and
   an amplifier with an input terminal coupled to said pulsewidth modulated signal, and first and second output terminals coupled to said first and second input terminals of said bridge circuit, respectively, wherein said amplifier provides pulsewidth modulated voltage across said first and second input terminals of said bridge circuit sufficient to maintain said resistance of said sensing means at a substantially constant resistance.

2. The air flow meter of claim 1 wherein said digital signals corresponding to said duty cycle are provided at additional one or more output terminals of said microcomputer.

3. The air flow meter of claim 1 wherein a first arm and a second arm of said bridge circuit each incorporate said resistive sensing means, wherein said bridge circuit is balanced when the ratio of the resistance across said first arm to the resistance across a third arm of said bridge circuit is equal to the ratio of the resistance across said second arm to the resistance across a fourth arm of said bridge circuit.

4. The air flow meter of claim 1 wherein said sensing means is a platinum wire.

5. The air flow meter of claim 1 wherein said bridge circuit is implemented in an integrated circuit.

6. The air flow meter of claim 1 wherein said algorithm maintains said voltage between said first and second output terminals of said bridge circuit within a certain range.

7. The air flow meter of claim 2 wherein a least significant bit change in said digital signals, representing said duty cycle, provided at said additional one or more output terminals of said microcomputer, produces a change in said output of said comparator.

8. The air flow meter of claim 1 wherein said comparator is a window comparator which detects whether said voltage difference between voltages at said first and second output terminals of said bridge circuit is within a certain range and outputs a first signal if said voltage difference is above said certain range and outputs a second output signal if said voltage difference is below said certain range.

* * * * *